(12) United States Patent
Rabe et al.

(10) Patent No.: US 9,663,051 B2
(45) Date of Patent: May 30, 2017

(54) CRASHBOX FOR A BUMPER SYSTEM OF A MOTOR VEHICLE

(71) Applicant: BENTELER AUTOMOBILTECHNIK GMBH, Paderborn (DE)

(72) Inventors: Frank Rabe, Hiddenhausen (DE); Andreas Schiller, Lippstadt (DE); Christian Handing, Langenberg (DE); Dariusz Straznikiewicz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/927,858

(22) Filed: Oct. 30, 2015

(65) Prior Publication Data
US 2016/0121830 A1    May 5, 2016

(30) Foreign Application Priority Data
Oct. 31, 2014 (DE) ......................... 10 2014 115 887

(51) Int. Cl.
 *B60R 19/34* (2006.01)
 *B60R 19/24* (2006.01)
(52) U.S. Cl.
 CPC .............. *B60R 19/34* (2013.01); *B60R 19/24* (2013.01)
(58) Field of Classification Search
 CPC ....... B60R 19/023; B60R 19/24; B60R 19/26; B60R 19/34
 USPC .................................................. 293/132, 133
 See application file for complete search history.

(56) References Cited

U.S. PATENT DOCUMENTS

| | | | | |
|---|---|---|---|---|
| 7,617,916 | B2 * | 11/2009 | Heatherington | B21D 22/025 188/371 |
| 9,187,127 | B2 * | 11/2015 | Tyan | B62D 21/152 |
| 2006/0096099 | A1 * | 5/2006 | Cripsey | B21D 53/88 29/897.2 |
| 2008/0098601 | A1 * | 5/2008 | Heinz | B21D 39/20 29/897.2 |
| 2016/0001726 | A1 * | 1/2016 | Keller | B60R 19/34 188/377 |

FOREIGN PATENT DOCUMENTS

| | | |
|---|---|---|
| DE | 100 14469 A1 | 10/2001 |
| DE | 10 2004 013 712 A1 | 8/2005 |
| DE | 10 2005 053 778 A1 | 5/2007 |

(Continued)

*Primary Examiner* — Jason S Daniels
(74) *Attorney, Agent, or Firm* — Sheridan Ross P.C.

(57) ABSTRACT

The invention relates to a crashbox for a bumper system of a motor vehicle, comprising an upper wall and a lower wall, wherein the crashbox is divided in the longitudinal extent thereof into a first length portion and an adjoining second length portion (4), wherein, in the first length portion, a longitudinal plane of the upper wall intersects a central longitudinal plane of the crashbox at an angle Δ1, and a longitudinal plane of the lower wall intersects the central longitudinal plane of the crashbox at an angle Δ2, wherein the following holds true: $-5°≤Δ1≤5°$ and $-5°≤Δ2≤5°$, and wherein, in the second length portion, a longitudinal plane of the upper wall (1) intersects a longitudinal plane of the lower wall at an angle α.

20 Claims, 7 Drawing Sheets

(56) References Cited

FOREIGN PATENT DOCUMENTS

| | | |
|---|---|---|
| DE | 10 2007 051 815 A1 | 5/2008 |
| DE | 10 2008 022 564 A1 | 11/2009 |
| DE | 10 2008 045 515 A1 | 3/2010 |
| DE | 10 2011 118 285 A1 | 8/2012 |
| EP | 1 762 438 A1 | 3/2007 |

* cited by examiner

CRASHBOX FOR A BUMPER SYSTEM OF A MOTOR VEHICLE

CROSS-REFERENCE TO RELATED APPLICATIONS

This application claims the benefit of German Patent Application No. DE 10 2014 115 887.3, filed Oct. 31, 2014, the entire content of which is incorporated herein by reference.

FIELD

The invention relates to a crashbox for a bumper system of a motor vehicle according to the preamble of patent claim 1.

BACKGROUND

Diverse types of crashboxes for bumper systems of motor vehicles are known. The crashbox is arranged between a bumper or a bumper crossmember and a vehicle or a vehicle longitudinal member. In order to protect the motor vehicle frame from pushing and/or shearing forces which are introduced into the crashbox via the bumper or the bumper crossmember in the event of a collision, the crashbox limits the transmitted force components to a value that is not harmful for the motor vehicle frame by converting the kinetic energy into heat and into internal material stresses by the plastic deformation of the crashbox. The joining points of the crashbox to the frame and to the bumper or bumper crossmember and to the vehicle or the vehicle longitudinal member are maintained here during the appropriate deformation of the crashbox.

In addition to tubular crashboxes with an annular or a polygonal cross-sectional area, which serve for the absorption of pushing and/or tensile forces and are manufactured, for example, as extruded profiles or pultrusion profiles from fiber-filled plastics or from an aluminum alloy, use is made of crashboxes of box-shaped or conical configuration in a shell-type construction which, in comparison to the tubular crashboxes, have greater resistance to transverse forces or bending moments and therefore a greater buckling strength.

In the case of the tubular crashboxes, a virtually uniform absorption of force can be achieved by the chip-removing or severing cutting of the casing body and also by turning over the casing surface of the crashbox from the inside to the outside over the length of the crashbox. In the case of the box-shaped or conical crashboxes, the absorption of force takes place by compression and extension of the casing body of the crashbox, wherein, as a result of bumps and dents formed in a regular arrangement in the casing, said casing creases during deformation. Beads and/or pressure release openings in the casing surface of the crashboxes permit a reduction in the component mass and serve for the intended or uniform deformation of the crashbox, wherein both the speed-dependent deformation properties of the material and of the joining points are to be taken into consideration and the unintended production of cracks or the breaking up of the crashbox are to be avoided.

A crashbox is thus described, for example in DE 10 2004 013 712 A1, in which the upper and lower walls of the crashbox converge continuously towards each other from a flange, with which the crashbox can be fastened to a vehicle crossmember, until said walls encounter the bumper crossmember, to which the crashbox is likewise fastened.

Furthermore, DE 100 14 469 A1 discloses a box-shaped crashbox in which the upper wall and lower wall, on the one hand, and the side walls, on the other hand, are arranged parallel to one another over the entire longitudinal extent of the crashbox.

DE 2005 053 778 A1 likewise describes a crashbox in which the upper wall and the lower wall converge towards each other over the entire longitudinal extent of the crashbox.

In all of the known designs of crashboxes, a satisfactory conversion of kinetic energy into heat or deformation energy as a consequence of a collision of a motor vehicle equipped with a crashbox of this type is indeed achieved. However, it has been shown that, under some circumstances, an asymmetrical deformation of the crashbox takes place, in particular in the vertical direction, and, in the extreme case, the crashbox walls even tear. This in particular occur in the case of a height offset between bumper, on the one hand, and vehicle longitudinal member, on the other hand.

SUMMARY

It is therefore the object of the invention to develop a crashbox according to the preamble of patent claim 1 in such a manner that asymmetrical deformations of the crashbox, in particular in the vertical direction, and tearing of the crashbox walls as a consequence of a collision of the motor vehicle are avoided, wherein a height offset between bumper, on the one hand, and vehicle longitudinal member, on the other hand, can preferably be realized by the crashbox.

This object is achieved by a crashbox for a bumper system of a motor vehicle with all of the features of patent claim 1. Advantageous refinements of the invention are found in the dependent claims.

The crashbox according to the invention for a bumper system of a motor vehicle with an upper wall and a lower wall is distinguished in that the crashbox is divided in the longitudinal extent thereof into a first length portion and an adjoining second length portion, wherein, in the first length portion, a longitudinal plane of the upper wall intersects a central longitudinal plane of the crashbox at an angle $\Delta 1$, and a longitudinal plane of the lower wall intersects the central longitudinal plane of the crashbox at an angle $\Delta 2$, wherein the following holds true: $-5° \leq \Delta 1 \leq 5°$ and $-5° \leq \Delta 2 \leq 5°$, and wherein, in the second length portion, a longitudinal plane of the upper wall intersects a longitudinal plane of the lower wall at an angle $\alpha$.

By means of the refinement according to the invention of the crashbox, a crashbox is now provided which, in the first length portion, over the entire longitudinal extent thereof, has a cross-sectional area which changes only insubstantially and in which, in the second length portion, by means of the upper wall and lower wall converging toward each other, the cross-sectional area of the crashbox is continuously reduced in the direction of the end at which the crashbox is joined to a bumper crossmember. It has been shown here that, both in the event of high speed crash tests and in the event of minor parking impacts at speeds of less than 16 km/h, the deformation behavior of the crashbox is highly homogeneous, and therefore no asymmetrical deformations, in particular in the vertical direction, or even tearing of the crashbox walls take place. By this means, the deformation of the crashbox can be particularly readily foreseen and controlled, and therefore greater account is thereby also taken of safety aspects and, by means of the homogeneous deformation behavior, the risk of injury to individuals involved in the collision is likewise significantly minimized. In particular if the longitudinal planes of the upper and lower walls run parallel to each other and to the central longitudinal plane of the crashbox in the first length portion of the crashbox such that the angles $\Delta 1$ and $\Delta 2$ are zero, this advantage according to the invention particularly readily comes to light. Within the context of the invention, a crashbox here should be understood as meaning an energy-absorbing deformation element which is configured in a box-shaped or tubular manner and is also known as an impact damper.

It has proven advantageous in the first advantageous refinement of the invention that, for the length ratio LV of the length L1 of the first length portion to the length L2 of the second length portion, the following holds true: LV=L1:L2 and $1/3 \leq LV \leq 2$, preferably $5/4 \leq LV \leq 7/4$, in particular LV=3/2. This geometrical refinement of the crashbox according to the invention once again improves the particularly homogeneous deformation of the crashbox in the event of a collision. The forces and energies in the event of deformation are namely introduced here into the crashbox in such a manner that a highly uniform absorption of the kinetic energy by the crashbox takes place and, as a result, a highly homogeneous deformation of the crashbox occurs.

It has proven particularly successful here to adjust the angle $\alpha$ between the longitudinal planes of the upper wall and the lower wall in the second length portion of the crashbox to $15° \leq \alpha \leq 60°$, in particular $25° \leq \alpha \leq 40°$, preferably $\alpha=30°$. This refinement of the arrangement of the upper and lower walls in the second length portion with respect to each other also brings about a particularly uniform absorption of the kinetic energy and therefore a particularly homogeneous deformation of the crashbox in the event of a collision.

In a particularly advantageous refinement of the invention, the angle $\Delta 1$ is equal to the angle $\Delta 2$, and
a) the longitudinal plane of the lower wall in the first length portion corresponds to the longitudinal plane of the lower wall in the second length portion, or
b) the longitudinal plane of the upper wall in the first length portion corresponds to the longitudinal plane of the upper wall in the second length portion.

In case a), an angle $\beta$, for which the following holds true: $\alpha+\beta+\Delta 2=180°$ or $\alpha+\beta-\Delta 2=180°$, is formed between the longitudinal plane of the upper wall in the first length portion and the longitudinal plane of the upper wall in the second length portion or, in case b), between the longitudinal plane of the lower wall in the first length portion and the longitudinal plane of the lower wall in the second length portion.

For the case that $\Delta 1=\Delta 2=0°$, the two angles $\alpha$ and $\beta$ namely form adjacent angles which complement each other to form 180°. By means of this special refinement of the invention, a height-offset arrangement of the bumper crossmember or bumper connected to the crashbox with respect to the vehicle longitudinal member is achieved. In particular, the mounting of the crashbox on the vehicle or the vehicle crossmember can thereby be designed in a simplified manner since the joining regions are particularly readily accessible. However, these advantages according to the invention are also afforded even if both the angle $\Delta 1$ and the angle $\Delta 2$ are defined within the range of between −5° and 5°, in particular between −2° and 2°. As a result, in the event of an asymmetrical introduction of load to the bumper crossmembers, the load is also substantially uniformly dissipated and distributed by the crashbox, and therefore deformation of the crashbox also takes place substantially uniformly, in particular in the longitudinal direction of the crashbox.

In a further refinement of the invention, two side walls connecting the upper wall to the lower wall are provided. Said side walls preferably run parallel to each other over the entire longitudinal extent of the crossmember, i.e. both in the first length portion and in the second length portion. In principle, however, it is also possible to design the side walls so as to converge toward each other in at least one of the two length portions. The connection of the upper wall to the lower wall by means of the side walls provides a particularly stable crashbox with which the introduction of force into the crashbox or the deformation of the crashbox in the event of a collision can be controlled in an even more targeted and effective manner, and therefore the homogeneity of the deformation of the crashbox in the event of a collision is increased once again.

Provision may be made here for the upper wall and/or the lower wall and/or at least one of the side walls to be provided with at least one predetermined deformation point. Predetermined deformation points of this type serve to control the deformation of the crashbox in the event of a collision in a targeted manner. The homogeneity of the deformation of the crashbox in the event of a collision is thereby also increased once again. It has proven advantageous here that the predetermined deformation points are designed in the form of transverse beads. Said beads may differ in design here. Firstly, said beads can be designed here to be concave, i.e. bent inward, and, secondly, also convex, i.e. bent outward. Control of the deformation of the crashbox in the event of a collision is thereby also improved once again. Longitudinal beads in the crashbox serve here essentially for setting and ensuring a defined force level and a high energy absorption capability in the event of a head-on impact.

In an advantageous manner, a transverse bead is provided in the upper wall of the first length portion in the region adjacent to the second length portion and/or in a side wall of the second length portion in the region adjacent to the first length portion.

According to another concept of the invention, the crashbox is formed from two half shells which are joined to each other, preferably in the region of the side walls. Such crashboxes formed from half shells are appropriate in particular if said crashboxes are formed from a steel or aluminum sheet. The production of crashboxes from two half shells is namely already embedded highly effectively technically in existing processes, and therefore these experiences can also be used in the production of the crashbox according to the invention.

On the other hand, it is of course also possible for the crashbox to be formed as an extruded profile. This embodiment is appropriate in particular if the crashbox is composed of magnesium, aluminum or an aluminum alloy or magnesium alloy and is to be manufactured in a tubular basic shape. The production of such extruded profiles is also highly sophisticated in terms of method, and therefore recourse can be made to already existing and sophisticated production methods.

Instead of a transverse bead, it is possible, in particular when aluminum alloys are used, to form the predetermined deformation points in the form of a weld seam or another heat-affected zone. By this means, it is possible to reduce the number of mechanical machining or manufacturing steps.

So that the crashbox can be connected to the vehicle or the vehicle longitudinal member, a flange is arranged at that end of the first length portion which is opposite the second length portion. Said flange can be joined in a simple manner to the vehicle or to the vehicle longitudinal member, and therefore a secure and fixed connection of the crashbox to the vehicle or the vehicle crossmember is produced, which connection continues to exist even in the event of a collision. For this purpose, it has proven successful also to provide a corresponding flange for the arrangement of the crashbox on the vehicle longitudinal member. Alternatively, however, it is also possible to insert the crashbox into the vehicle longitudinal member and then to join said crashbox thereto.

The arrangement of an attachment portion on the upper wall, which attachment portion is arranged at that end of the second length portion which is opposite the first length portion, aims in the same direction. With the aid of said attachment portion, the crashbox according to the invention can be joined in a simple manner to a bumper crossmember or a bumper such that a connection which is secure and is stable in the event of a collision is also ensured between crashbox and bumper crossmember or bumper.

A bumper system for a motor vehicle with at least one previously described crashbox, by means of which a height offset between vehicle longitudinal member and bumper crossmember can be realized in a simple manner, and also a motor vehicle with such a bumper system are also intended to be independently protected by the invention.

Further aims, advantages, features and possible uses of the present invention will emerge from the following description of a plurality of exemplary embodiments on the basis of the drawings. In this case, all of the features described and/or illustrated in the figures form the subject matter of the present invention individually or in any desired meaningful combination, even independently of the combination thereof in the claims or the back-references of the latter.

DETAILED DESCRIPTION

Figure 1:
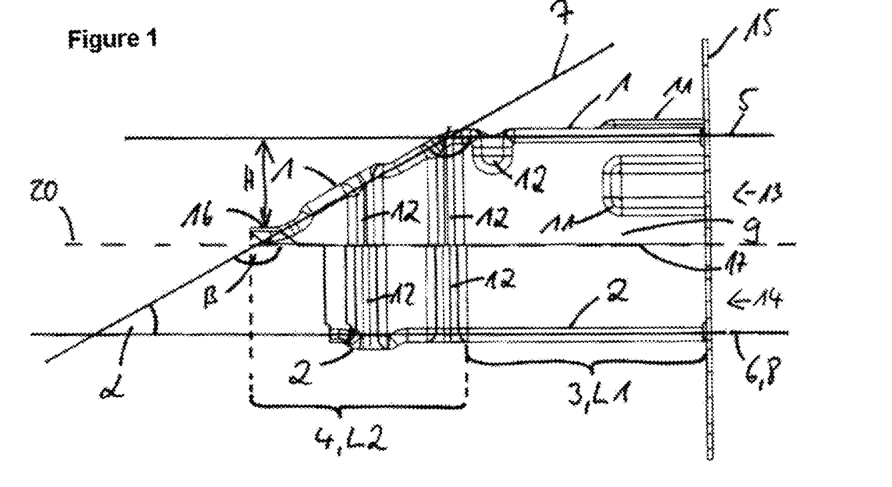
FIG. 1 shows a first exemplary embodiment of a crashbox according to the invention in a side view.

FIG. 1 illustrates a first exemplary embodiment of a crashbox according to the invention in a side view. The crashbox there has an upper wall 1 which lies in a first length portion 3 with the length L1 in a longitudinal plane 5 while the upper wall 1 lies in a second length portion 4 with the length L2 in a longitudinal plane 7. The longitudinal plane 7 of the second length portion 4 intersects the longitudinal plane 5 of the first length portion 3 at an angle β. Furthermore, the crashbox has a lower wall 2 which, in the first length portion L1 of the crashbox, runs in a longitudinal plane 6 and, in the second length portion 4 of the crashbox, runs in a longitudinal plane 8. In the present exemplary embodiment in FIG. 1, the two longitudinal planes 6 and 8 are identical. The longitudinal planes 6 and 8 of the lower wall 2 intersect the longitudinal plane 7 of the upper wall 1 in the second length portion 4 at an angle α. As can be gathered from FIG. 1, the angles α and β form adjacent angles which complement each other to form 180°.

The arrangements of the longitudinal planes 5 to 8 and of the angles α and β are illustrated here only in FIG. 1 but can also be analogously transferred to FIGS. 2 and 5 to 8. However, for reasons of clarity, the illustrations of the longitudinal planes 5 to 8 and of the angles α and β have been omitted in FIGS. 2 and 5 to 8.

Figure 2:
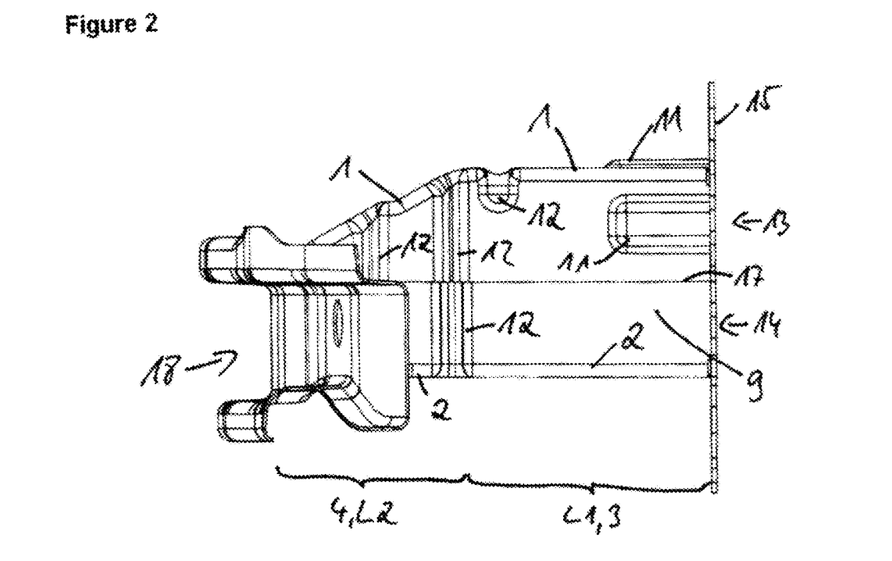
FIG. 2 shows the crashbox according to FIG. 1 with bumper crossmember arranged thereon, in a side view.
Figure 3:
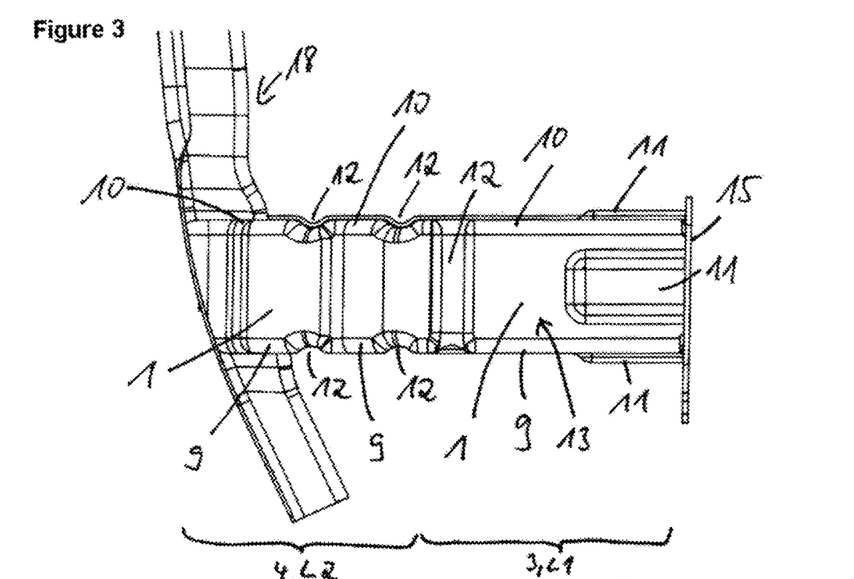
FIG. 3 shows the crashbox according to FIG. 2 in a plan view from above.
Figure 4:
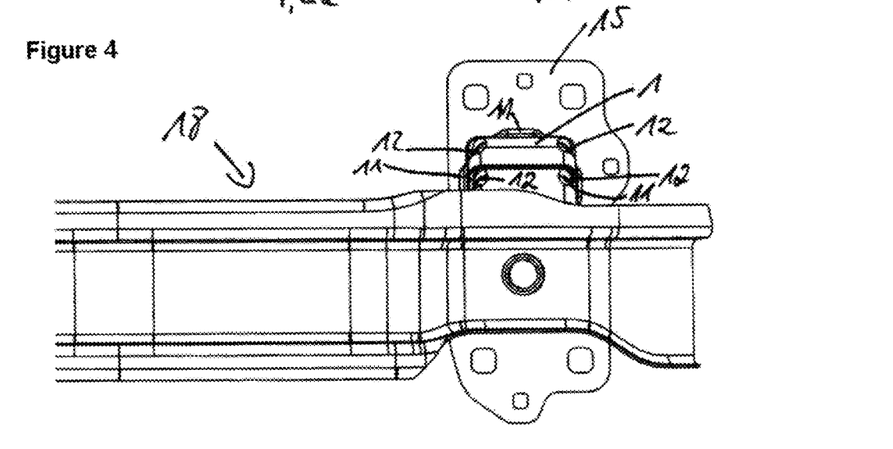
FIG. 4 shows the crashbox according to FIG. 1 in a plan view from the front.

The exemplary embodiment of FIG. 1 is also shown further in FIGS. 2 to 4 in different views and with bumper crossmember 18 arranged thereon such that also in particular a height offset H is visible between bumper crossmember 18 and the longitudinal plane 5 of the upper wall 1 in the first length portion 3 of the crashbox.

The crashbox of the exemplary embodiment of FIGS. 1 to 4 is formed here from an upper half shell 13 and a lower half shell 14 which are joined to each other in a joining region 17. The half shells 13 and 14 are composed here of a steel sheet or aluminum sheet, and therefore said half shells are joined to each other in the joining region 17 by means of welding, for example.

Side walls 9 and 10 which connect the upper wall 1 to the lower wall 2 are also formed here by the two half shells 13 and 14. By this means, the crashbox obtains a cross-sectionally closed profile which, in the present case, is of substantially rectangular design. In the exemplary embodiment of FIGS. 1 to 4, the length ratio LV of the length L1 of the first length portion 3 of the crashbox to the length L2 of the second length portion 4 of the crashbox is 3:2. This geometrical refinement results in the particularly homogeneous deformation behavior of the crashbox in the event of a collision. The upper wall 1 and the lower wall 2 are spaced apart here in such a manner that the angle α is approximately 30°. As a result of the fact that the angles α and β in this exemplary embodiment form adjacent angles, the value of the angle β in this exemplary embodiment is therefore approximately 150°. The selection of these angle amounts is also targeted in the direction of as homogeneous a deformation as possible of the crashbox in the event of a collision.

So that, in the event of a collision, a targeted and controllable deformation which is as homogeneous as possible takes place, predetermined deformation points in the form of transverse beads 12 are arranged in the walls 1, 2, 9 and 10 of the crashbox. In this exemplary embodiment of FIGS. 1 to 4, a transverse bead 12 in the first length portion 3 in the upper wall 1 is arranged directly adjacent to the second length portion of the crashbox, said transverse bead being of concave design, i.e. extending into the interior region of the crashbox. Furthermore, the upper wall 1 is also provided, in the length portion 3, with a longitudinal bead 11 which, however, in contrast to the previously described transverse bead 12, is of convex design and serves for the homogenization of the force level during deformation of the crashbox in the event of a crash. Furthermore, the side walls 9 and 10 in the region of the upper half shell 13 in the first length portion 3 likewise have convexly designed longitudinal beads 11. This convex design of said longitudinal beads 11 can be gathered in particular from FIGS. 3 and 4.

In the second length portion 4 of the crashbox, transverse beads 12 are likewise provided in the lower half shell 14 and in the upper half shell 13 to control the deformation in the event of a collision. Said transverse beads 12 in the second length portion 4 are also of concave design here, as can be gathered in particular from FIG. 3.

So that the crashbox according to the invention can also be arranged on a motor vehicle or on a motor vehicle crossmember, a flange 15 is provided which is joined to that end of the first length portion 3 of the crashbox which is opposite the second length portion 4. By means of said flange 15, the crashbox can be connected to a vehicle or to a vehicle longitudinal member, wherein the connection between crashbox and motor vehicle or motor vehicle crossmember continues to exist even in the event of a crash.

Figure 5:
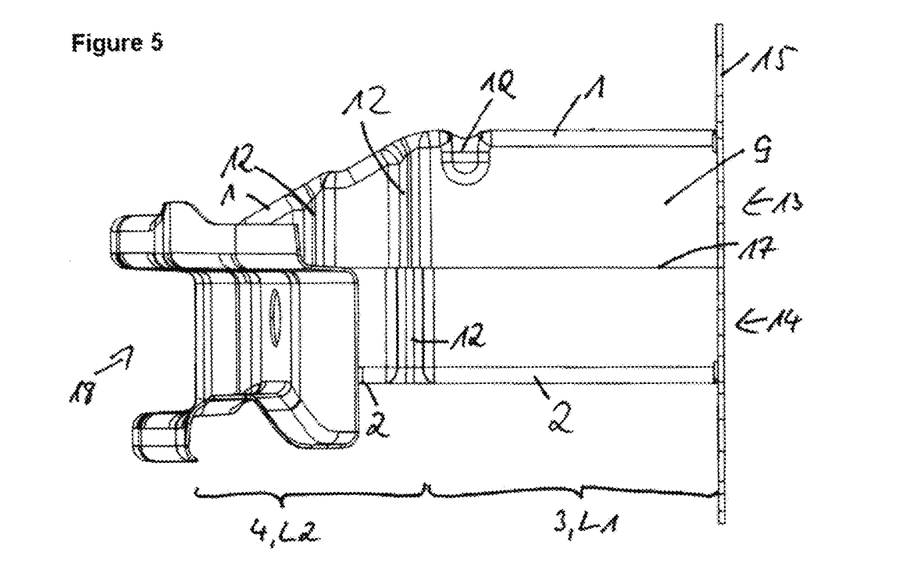
FIG. 5 shows a second exemplary embodiment of a crashbox according to the invention with bumper crossmember arranged thereon, in a side view.

FIG. 5 now shows a further exemplary embodiment of a crashbox formed from two half shells 13 and 14. As can be gathered therefrom, this exemplary embodiment substantially corresponds in the geometrical construction thereof to that of FIGS. 1 to 4. However, in this exemplary embodiment, the formation of longitudinal beads in the upper wall 1 and in the side walls 9 and 10 has been omitted in the first length portion L3. Deformation control aids are formed here in the side walls 9 and 10 merely in the form of the transverse beads 12 which, in the present exemplary embodiment, are likewise again shaped concavely. The two half shells 13 and 14 have again been connected to each other in a joining region 17, for example by a welding process. The length ratio LV of the length L1 of the first length portion 3 to the length L2 of the second length portion 4 corresponds here as in the exemplary embodiment of FIGS. 1 to 4 approximately to the ratio 3:2.

Figure 6:
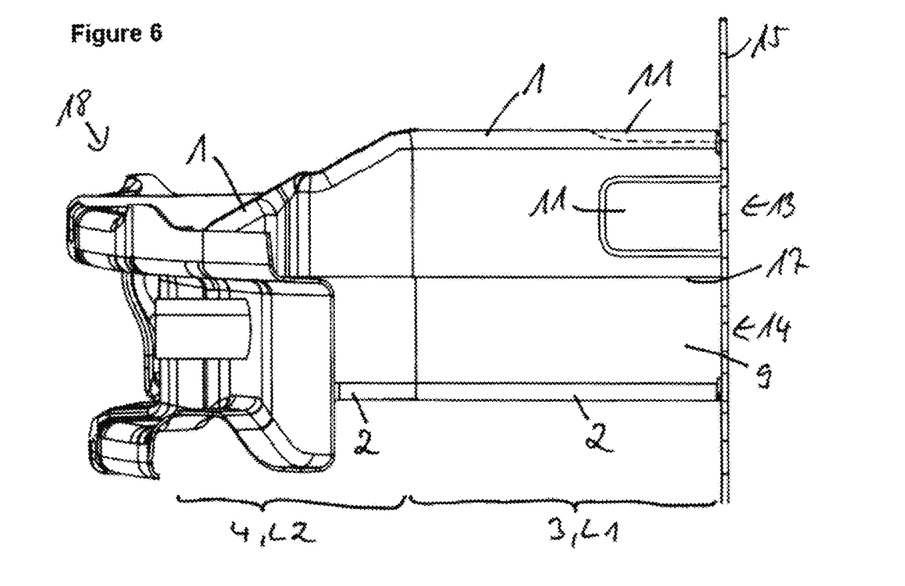
FIG. 6 shows a third exemplary embodiment of a crashbox according to the invention with bumper crossmember arranged thereon, in a side view.

A further exemplary embodiment of a crashbox according to the invention formed from two half shells 13 and 14 is shown in FIG. 6. The geometrical ratios of the length portions 3 and 4 and the arrangement of the upper wall 1 and of the lower wall 2 substantially correspond here to that of the exemplary embodiments of FIGS. 1 to 5. In contrast thereto, a transverse bead is not arranged here in the first length portion 3, and the longitudinal bead 11, which is arranged in the upper wall 1 in the first length portion 3, is shaped concavely precisely like the longitudinal beads 11 arranged in the side walls 9 and 10. Instead of the transverse beads, an opening can also be formed in the transition region of the side walls 9 and 10 and of the upper wall 1.

The crashboxes illustrated in the exemplary embodiments of FIGS. 1 to 6 are produced here substantially from steel or aluminum sheets which have been deformed to form the corresponding half shells 13 and 14 and joined to one another in the joining region 17.

Figure 7:
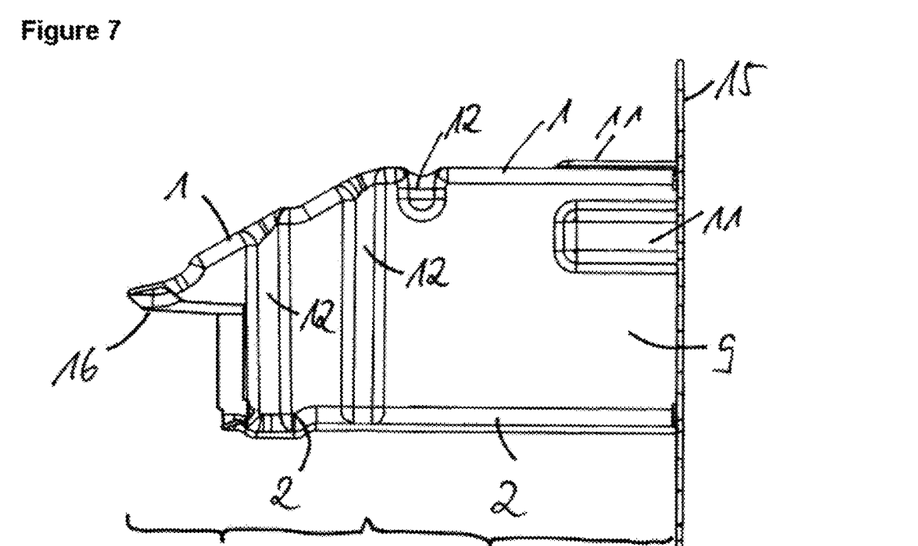
FIG. 7 shows a fourth exemplary embodiment of a crashbox according to the invention in a side view.
Figure 8:
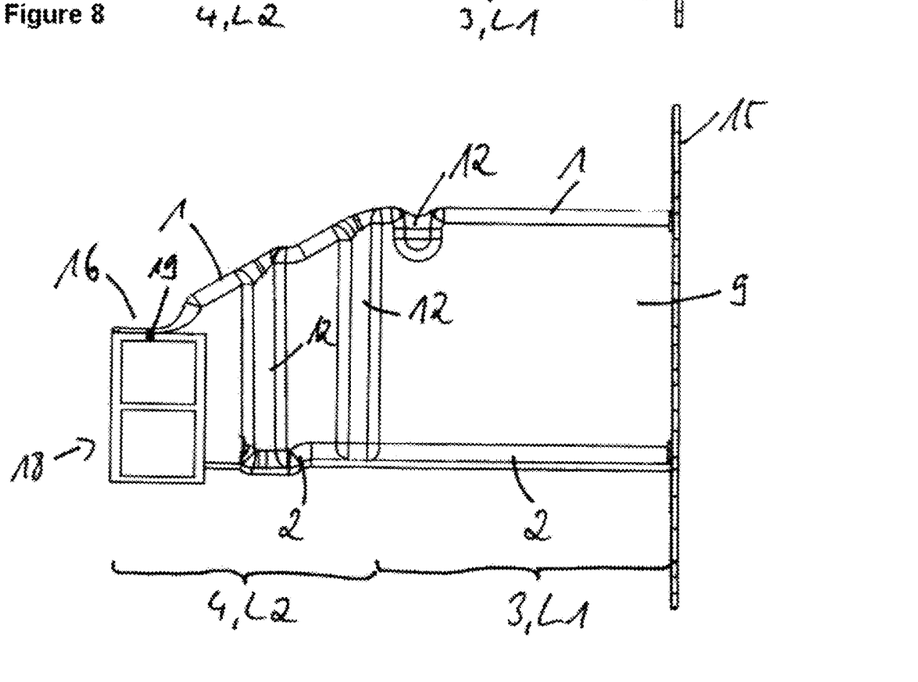
FIG. 8 shows a fifth exemplary embodiment of a crashbox according to the invention in a side view.

In contrast thereto, FIGS. 7 and 8 now show crashboxes produced from extruded profiles composed of aluminum or magnesium. The geometrical ratios also correspond here in respect of the lengths L1 and L2 of the length portions 3 and 4 and the arrangement of the upper wall 1 with respect to the lower wall 2 substantially to that of the exemplary embodiments of FIGS. 1 to 6. In the two exemplary embodiments, a transverse bead 12 is located in the upper wall 1 of the first length portion 3 directly adjacent to the second length portion 4. By this means, a "formation of a block" over half the length and therefore an asymmetrical or pulse-like introduction of load into the vehicle longitudinal member in the event of a crash are avoided. While the exemplary embodiment of FIG. 7 now again has longitudinal beads 11 of convex design and a transverse bead 12 of concave design in the upper wall 1 and in the side walls 9 and 10 in the first length portion 3, longitudinal beads are omitted in the exemplary embodiment of FIG. 8. However, the two exemplary embodiments have transverse beads 12 which are formed concavely in the side walls 9 and 10 in the second length portion 4.

In the exemplary embodiment of FIG. 8, an attachment portion 16 which is of flat design and on which a bumper crossmember 18 is arranged by means of a joining element 19 is shown here in the upper wall 1 in the second length portion. The joining can take place here by means of a welding process, and therefore the joining element 19 here can be a weld seam or a welding point.

If the crashbox is produced from aluminum or magnesium, soft zones which are introduced by heat treatment, or else weld seams, can also be used instead of transverse beads as predetermined deformation points.

Figure 9:
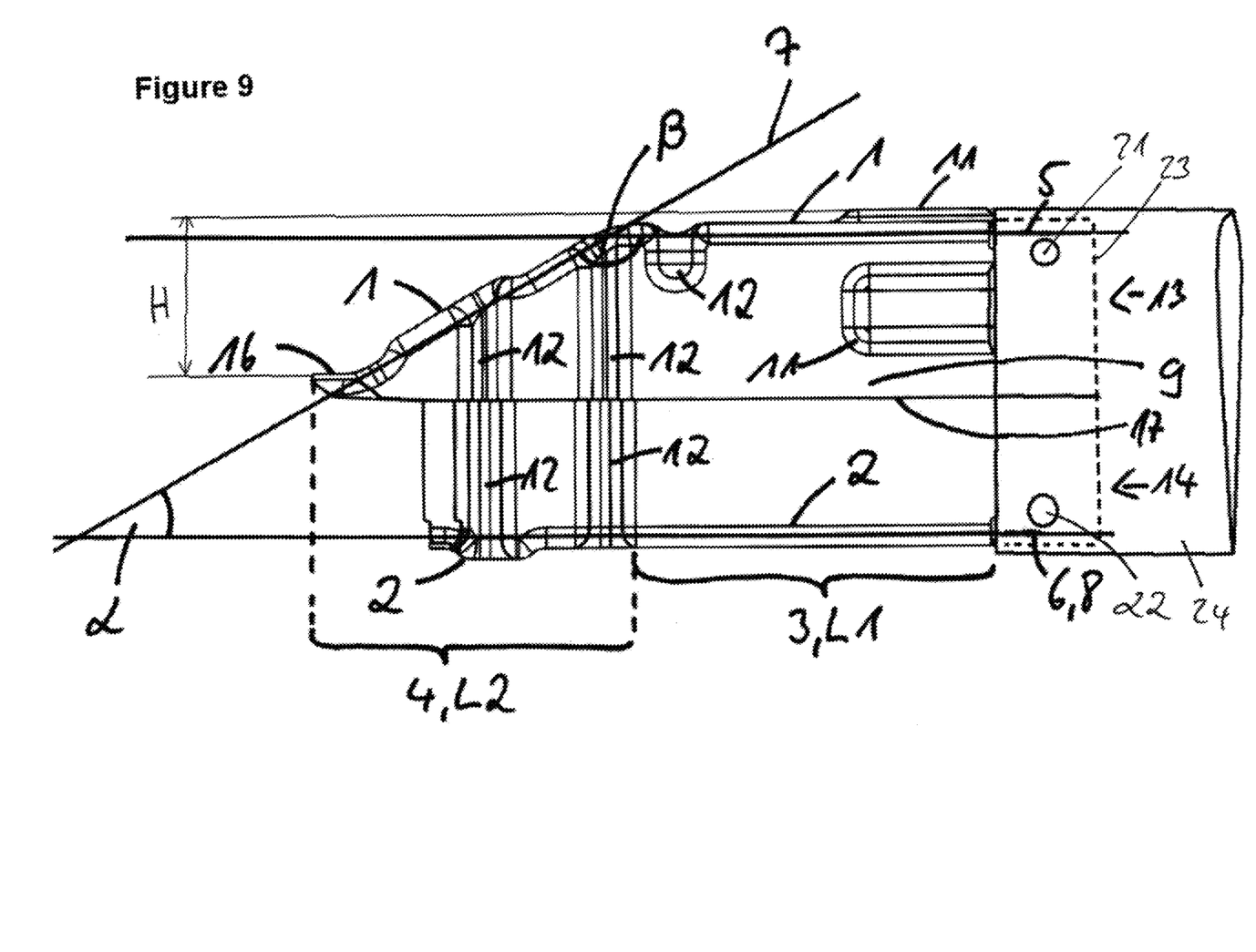
FIG. 9 shows a sixth exemplary embodiment of a crashbox according to the invention in a side view.

FIG. 9 shows a crashbox which is designed as a plug-in part and can be plugged into a vehicle longitudinal member 24. For the joining or fastening of crashbox and vehicle longitudinal member, attachment elements 21 and are provided here on a plug-in portion 23 of the crashbox.

Figure 10:
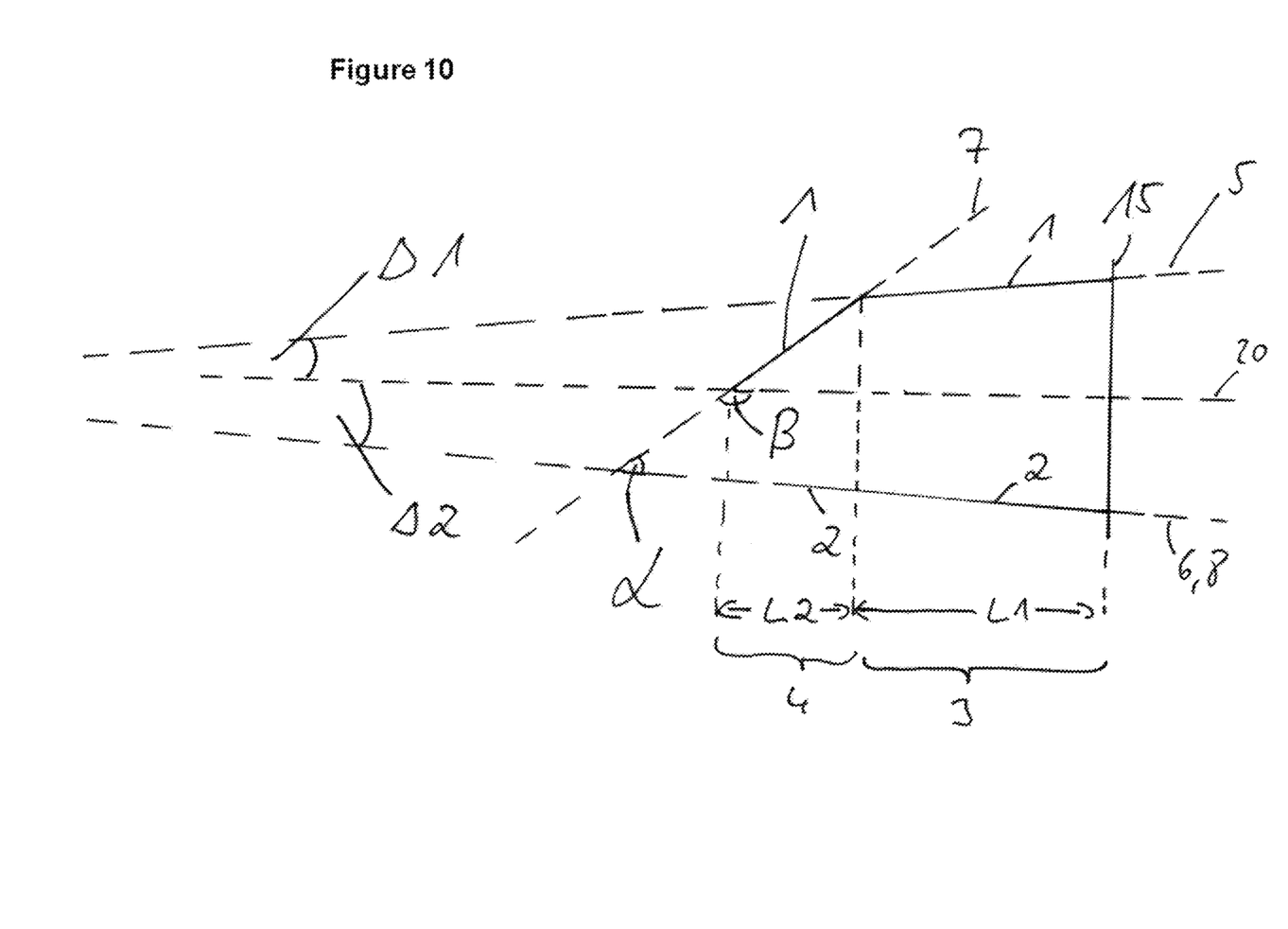
FIG. 10 shows a seventh exemplary embodiment of a crashbox according to the invention in a schematic side view.
Figure 11:
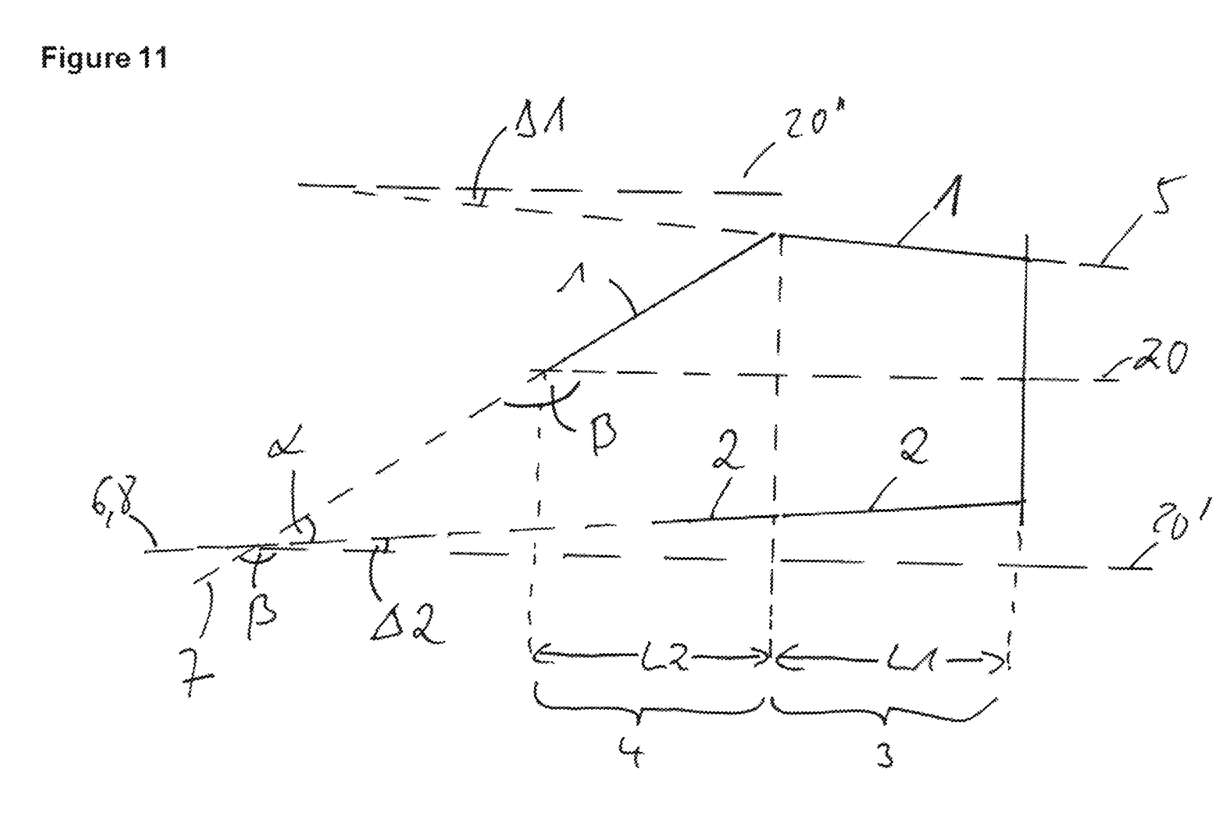
FIG. 11 shows an eighth exemplary embodiment of a crashbox according to the invention in a schematic side view.

FIGS. 10 and 11 now schematically illustrate crashboxes according to the invention in which the longitudinal planes 5 and 6 of the upper wall 1 and the lower wall 2 do not run parallel to each other in the first length portion 3. By this means, the arrangement of the individual angles of interception $\alpha$, $\beta$, $\Delta 1$ and $\Delta 2$ with respect to one another is particularly readily clarified since the angles $\Delta 1$ and $\Delta 2$ are equal to zero in the exemplary embodiments of FIGS. 1 to 9.

In the exemplary embodiment of FIG. 10, the upper wall 1 and the lower wall 2 of the first length portion converge toward each other in the direction of the second length portion 4. Therefore, the following holds true here $\Delta 1 = \Delta 2$: $\alpha + \beta - \Delta 2 = 180$.

In the exemplary embodiment of FIG. 11, the upper wall 1 and the lower wall 2 of the first length portion 3 diverge in the direction of the second length portion 4. Therefore, the following holds true here: $\Delta 1 = \Delta 2$: $\alpha + \beta + \Delta 2 = 180$. For better illustration of the angles $\Delta 1$ and $\Delta 2$, two auxiliary planes 20' and 20" which run parallel to a central longitudinal plane 20 of the crashbox are also shown in FIG. 11 here.

LIST OF REFERENCE SIGNS

1 Upper wall
2 Lower wall
3 First length portion
4 Second length portion
5 Longitudinal plane
6 Longitudinal plane
7 Longitudinal plane
8 Longitudinal plane
9 Side wall
10 Side wall
11 Longitudinal bead
12 Transverse bead
13 Half shell
14 Half shell
15 Flange
16 Attachment portion
17 Joining region
18 Bumper crossmember
19 Joining element
20 Central longitudinal plane
20' Auxiliary plane 20" Auxiliary plane
21 Attachment element
22 Attachment element
23 Plug-in portion
24 Vehicle longitudinal member
α Angle
β
Δ1 Angle
Δ2 Angle
L1 Length of the first length portion
L2 Length of the second length portion
LV Length ratio L1/L2

What is claimed is:

1. A crashbox for a bumper system of a motor vehicle, comprising:
   an upper wall;
   a lower wall; and
   a crossmember coupled to the upper wall,
      wherein the crashbox is divided in a longitudinal extent thereof into a first length portion and an adjoining second length portion,
      wherein, in the first length portion, a first longitudinal plane of the upper wall intersects a central longitudinal plane of the crashbox at an angle Δ1, and a first longitudinal plane of the lower wall intersects the central longitudinal plane of the crashbox at an angle Δ2,
      wherein the following holds true: $-5° \leq \Delta 1 \leq 5°$ and $-5° \leq \Delta 2 \leq 5°$,
      wherein, in the second length portion, a second longitudinal plane of the upper wall intersects the first longitudinal plane of the lower wall at an angle α,
      wherein, in the second length portion, an end of the upper wall extends beyond an end of the lower wall, and
      wherein an upper surface of the cross member is coupled to the end of the upper wall.

2. The crashbox as claimed in claim 1, wherein, for a length ratio (LV) of the length of the first length portion (L1) to the length of the second length portion (L2), the following holds true: LV=L1/L2 and $1/3 \leq LV \leq 2$.

3. The crashbox as claimed in claim 1, wherein, for the angle α, the following holds true: $15° \leq \alpha \leq 60°$.

4. The crashbox as claimed in claim 1, wherein the following holds true: Δ1=Δ2, and
   either the first longitudinal plane of the lower wall in the first length portion corresponds to a second longitudinal plane of the lower wall in the second length portion, or the first longitudinal plane of the upper wall in the first length portion corresponds to the second longitudinal plane of the upper wall in the second length portion, and therefore an angle β is formed either between the first longitudinal plane of the upper wall in the first length portion and the second longitudinal plane of the upper wall in the second length portion, or between the first longitudinal plane of the lower wall in the first length portion and the second longitudinal plane of the lower wall in the second length portion, wherein the following holds true: $\alpha+\beta+\Delta 2=180°$ or $\alpha+\beta-\Delta 2=180°$.

5. The crashbox as claimed in claim 1, wherein two side walls connecting the upper wall to the lower wall are provided.

6. The crashbox as claimed in claim 5, wherein the upper wall and/or the lower wall and/or at least one of the side walls are/is provided with at least one longitudinal bead and/or with at least one predetermined deformation point.

7. The crashbox as claimed in claim 5, wherein a transverse bead is provided in the upper wall of the first length portion in a region adjacent to the second length portion and/or in a side wall of the second length portion in a region adjacent to the first length portion.

8. The crashbox as claimed in claim 5, wherein said crashbox is formed from sheet metal which is bent in a u-shaped or o-shaped manner and ends of which are joined to each other.

9. The crashbox as claimed in claim 5, wherein said crashbox is formed as an extruded profile.

10. The crashbox as claimed in claim 5, wherein the upper wall and/or the lower wall and/or at least one of the side walls are/is provided with at least one longitudinal bead and/or with at least one predetermined deformation point in the form of a transverse bead or a weld seam or another heat-affected zone.

11. The crashbox as claimed claim 1, wherein said crashbox is formed from two half shells which are joined to each other in a region of the side walls.

12. The crashbox as claimed in claim 1, wherein said crashbox is composed of steel, magnesium, aluminum or an aluminum alloy.

13. The crashbox as claimed in claim 1, wherein a flange is arranged at an end of the first length portion which is opposite the second length portion.

14. The crashbox as claimed in claim 1, wherein an attachment portion is arranged on the upper wall at an end of the second length portion which is opposite the first length portion.

15. A bumper system for a motor vehicle with at least one crashbox as claimed in claim 1.

16. A motor vehicle with a bumper system as claimed in claim 15.

17. The crashbox as claimed in claim 1, wherein, for a length ratio (LV) of the length of the first length portion (L1) to the length of the second length portion (L2), the following holds true: LV=L1/L2 and $5/4 \leq LV \leq 7/4$.

18. The crashbox as claimed in claim 1, wherein, for a length ratio (LV) of the length of the first length portion (L1) to the length of the second length portion (L2), the following holds true: LV=L1/L2 and LV=3/2.

19. The crashbox as claimed in claim 1, wherein, for the angle α, the following holds true: $25° \leq \alpha \leq 40°$.

20. The crashbox as claimed in claim 1, wherein, for the angle α, the following holds true: α=30°.

* * * * *